United States Patent [19]
Hart et al.

[11] Patent Number: 5,584,261
[45] Date of Patent: Dec. 17, 1996

[54] NON-CONDUCTIVE DAIRY PARLOR ENTRY GATE

[75] Inventors: Mark E. Hart, Gladstone, Mo.; Lars H. Andersson, Sodertalje, Sweden

[73] Assignee: Alfa Laval Agri Inc., Kansas City, Mo.

[21] Appl. No.: 333,853

[22] Filed: Nov. 3, 1994

[51] Int. Cl.⁶ ........................................... A01K 1/12
[52] U.S. Cl. .................... 119/14.03; 119/51.02; 119/524
[58] Field of Search ................ 119/14.03, 14.04, 119/27, 51.02, 737, 734, 783; 49/381, 501

[56] References Cited

U.S. PATENT DOCUMENTS

| | | | |
|---|---|---|---|
| 2,904,001 | 9/1959 | Ferris | 119/14.03 |
| 4,196,697 | 4/1980 | Poiesz | 119/51.02 |
| 4,513,690 | 4/1985 | Waldron | 119/734 X |
| 4,559,904 | 12/1985 | Harmsen | 119/51.02 |
| 4,798,175 | 1/1989 | Townsend et al. | |

FOREIGN PATENT DOCUMENTS

| | | | |
|---|---|---|---|
| 3024692 | 1/1982 | Germany | 119/51.02 |
| 211269 | 7/1984 | Germany | 119/27 |

OTHER PUBLICATIONS

"The User-Friendly Parlor" by Rick Mooney in Sep. 1991 issue of Dairy Today, pp. 16–17.
Bou-Matic Publication No. 12P-040-0792 entitled "The Bou-Matic Xpressway Parallel Milking Center".
Bou-Matic Xpressway Herringbone Cow Parlor ad appearing at p. 5 of the Sep. 1994 issue of Dairy Today.
Pp. 44–45 and 50–52 of The Catalog for Dairy Equipment & Supplies Fall/Winter 1994 by Alfa Laval Agri Inc.
Pp. 285–306, 311–320 and 329–330 of *Milking Machine and Lactation* by A. J. Bramley et al.

*Primary Examiner*—Robert P. Swiatek
*Assistant Examiner*—Elizabeth Shaw
*Attorney, Agent, or Firm*—Hovey, Williams, Timmons & Collins

[57] ABSTRACT

A non-conductive dairy parlor gate is provided which retains the strength and corrosion resistance of magnetically conductive materials while permitting the gate to swing into and/or through an electromagnetic field generated by an electronic identification system for use with animal-worn transponders. The gate includes at least two magnetically conductive parts connected by an electrically non-conductive member to interrupt the formation of a magnetic loop. The gate may include additional structural members for strength and which inhibit a dairy animal from placing her head through the gate. The gate is used as a part of a dairy parlor and placed along an animal passage lane to prevent dairy animals from moving their transponders past the identification system prematurely. The gate may be positioned adjacent a milking stall to retain one dairy animal in position while inhibiting the passage of a second set of animals into the milking stalls.

17 Claims, 2 Drawing Sheets

NON-CONDUCTIVE DAIRY PARLOR ENTRY GATE

BACKGROUND OF THE INVENTION

1. Field of the Invention

This invention concerns a dairy parlor gate particularly useful in connection with electronic animal identification systems. More particularly, the invention concerns a non-magnetically conductive gate with an electrically non-conductive coupler to interrupt the formation of a magnetic loop, and a dairy parlor incorporating the gate, whereby the gate is mounted for swinging movement into and/or through the electromagnetic field of the identification system.

2. Description of the Prior Art

The modern dairy farm increasingly employs highly technical features to maximize animal throughput and milk production. While dairy animals may include goats or other animals, cows are by far the animals most frequently milked in large dairy operations. Many farms can now milk upwards of one hundred cows at a time, with entry to the milking stalls controlled by automated systems. To this end, automatic entry gates are provided for entry of a string of cows into the milking stalls. These stalls may have different arrangements known to those in the industry as parallel, herringbone, etc. The cows enter the milking area and face in a common direction to permit the operator to attach milking equipment to the udders of the cows in sequence. After the milk is extracted, the cows leave the milking stalls in unison and a new string of cows are admitted into the milking stalls.

As dairy farmers seek to achieve greater efficiency, monitoring many facets of the cow including the milk production and feed intake becomes important. A now accepted method of achieving this result is the use of transponders suspended from a strap around the cows neck. For example, U.S. Pat. No. 4,798,175, hereby incorporated by reference, discloses an electronic identification system for identifying an animal moving through a portal structure. The identification system includes a transponder for attaching to a cow and an antenna loop which generates a multi-directional electromagnetic field in a portal structure. The transponder is energized by the electromagnetic field when the cow passes through the portal structure. The energized transponder transmits identifying data to a microprocessor for use in counting and identifying the cow. By reading the transponders of each cow, the number of pounds of milk, measured by weigh meters at each stall, can be monitored and recorded to ensure that feeding and breeding are properly controlled.

One problem which has been prevalent in the use of such electronic identification systems in dairy parlors has involved reading the transponder of the first cow in the string. Typical dairy parlor installations have positioned the gate controlling entry into the milking parlors far enough away from the scanner of the identification system so that the transponder worn by the first cow in the string is not activated by the scanner. This first cow's head is already past the scanner when the gate opens and there is nothing to compel the cow to move back so that the transponder can be read. Thus, the effectiveness of the monitoring system is reduced. The placement of the entry gate on the milking stall side of the scanner rather than ahead of the scanner is preferred by farmers so that the gate can also hold the last cow of the string in position against lateral movement. That is to say, when the gate is in the closed position, the last cow is held between a stanchion and the entry gate to prevent her from moving out of position and the reach of the herdsman.

The stanchions and gates in the dairy parlor must be strong to withstand the stress of controlling cows weighing in excess of half a ton. The most popular dairy cow is the Holstein, which is also typically the largest. Gates and stanchions must also withstand the harsh chemicals used in cleaning and flushing a barn, as well as the urine, manure and other naturally generated but corrosive materials. For these reasons, synthetic resin or aluminum gates and stanchions have been unsatisfactory, with stainless steel and galvanized steel being far and away the preferred and accepted materials for stanchion, stall and gate construction in the parlor.

Unfortunately, stainless and galvanized steel include significant quantities of magnetically conductive materials, which include iron, nickel and cobalt, and thus interfere with the operation of the electronic identification system. When an electrically conductive gate having a magnetically conductive loop passes into and/or through the identification system, the magnetically conductive gate becomes charged by the electromagnetic field. This diminishes the strength of the electromagnetic field and interferes with the normal operation of the animal identification system. More particularly, this interference often results in insufficient electromagnetic coupling between the antenna loop and the transponder attached to the cow.

There has accordingly developed a need for a dairy parlor gate which can be positioned between the identification system and the milking stall, made of stainless steel or galvanized steel, and which can be placed adjacent to the identification system electromagnetic field without interfering with its operation.

SUMMARY OF THE INVENTION

These objects have largely been met by the dairy parlor gate of the present invention. That is to say, the present invention presents a gate which is durable and has sufficient strength to withstand impact by large dairy animals, is resistant to corrosion, can be placed next to the identification system to ensure that the first animal's transponder is read, does not interfere with the operation of the identification system, and can hold a cow in proper milking position in the milking stall.

The non-magnetically conductive gate hereof is provided with first and second magnetically conductive portions which will typically be made of stainless or galvanized steel, and an electrically non-conductive coupler preferably of synthetic resin material but which could be ceramic or any other electrically non-conductive material which effectively insulates the gate portions from one another. The coupler joins the two magnetically conductive portions together without permitting the creation of a magnetically conductive loop. In this way, the electromagnetic field created by the identification system is not affected by the passage of the gate therethrough, and the identification system is able to read each transponder as the cow wearing it passes through the portal of the identification system. The addition of further structural members such as cross-members or the like is accompanied by the inclusion of additional non-conductive couplers to prevent the formation of magnetically conductive loops in the gate which would pass into and/or through the electromagnetic field. The magnetically conductive portions are preferably stainless steel or galvanized steel tubes, and the couplers are preferably cylindrical members with a raised shoulder at the midpoint to prevent contact and magnetic flux between the magnetically conductive members to be connected. Similar T or cruciform connectors can be provided for joining three or four magnetically conductive portions, if desired.

The gate hereof is used in a milking parlor which is provided with opposed upright stanchions or fences which defines an animal passage lane. The gate is preferably used with an electronic identification system positioned adjacent the gate with the gate between the portal of the system and the milking stall. The gate is preferably provided with a bell crank arm which may be coupled to an extensible member such as a ram or piston to swing the gate between an open and closed position. The gate is positioned proximate the portal so as to swing into and/or through the electromagnetic field as it opens. In this way, the first cow may be required to back up and thereby ensure that the transponder is read as it thereafter moves forwardly through the portal.

The gate may be mounted on hinges or a shaft for pivoting about either a vertical or horizontal axis. In the closed position, it is preferably oriented in a vertical plane and positioned so as to hold the cow against undesired lateral movement to thereby aid the operator in attaching milking apparatus to the udder.

These and other advantages of the present invention will be appreciated by those skilled in the art with reference to the drawings and the following description.

DESCRIPTION OF THE PREFERRED EMBODIMENT

Figure 1:
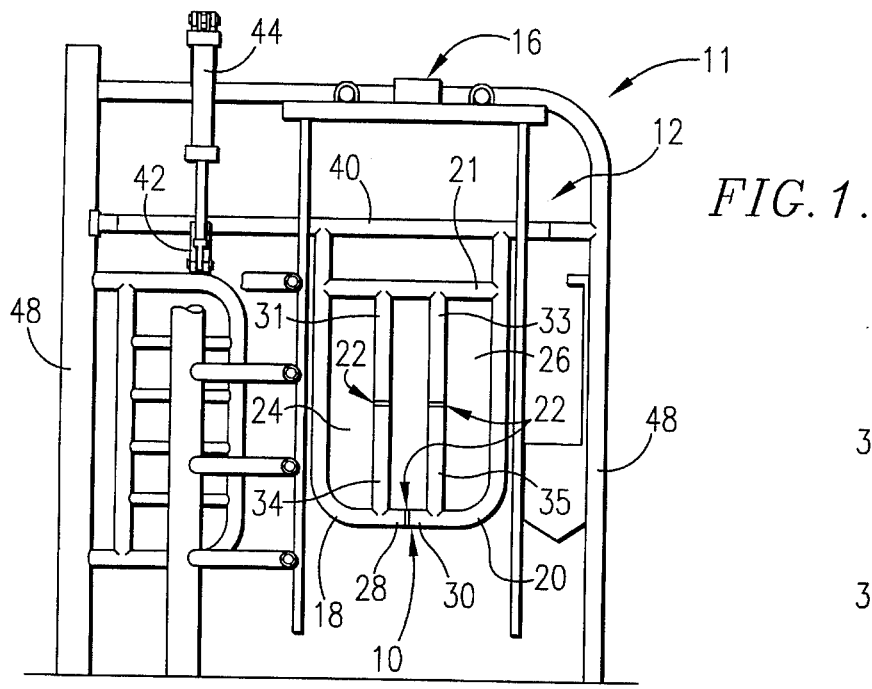
FIG. 1 is a front elevational view of the dairy parlor entry gate of the present invention in a milking parlor, showing the gate mounted on a shaft for pivoting about a horizontal axis.

Referring to the drawing figures, and particularly FIG. 1, a non-conductive dairy parlor entry gate 10 constructed in accordance with the preferred embodiment of the invention is shown. As described in detail below, the entry gate 10 is preferably used in a milking parlor 11 for controlling the entry of a plurality of cows 13 into the milking parlor 11. As described in detail below, the preferred milking parlor 11 includes a portal structure 12 for guiding the cows 13 to a plurality of milking stalls 14. The portal structure 12 is provided with an animal identification system 16 for identifying and counting the cows moving through the portal structure 12. The entry gate 10 is positioned proximate the portal structure 12 for controlling the passage of cows therethrough.

The preferred entry gate 10 broadly includes first and second magnetically conductive portions 18 and 20 and a non-conductive coupler 22. As described in more detail below, the conductive portions 18 and 20 are joined together by the non-conductive coupler 22 to form an entry gate which can pass into and/or through the portal structure 12 without interfering with the operation of the animal identification system 16.

The conductive portions 18 and 20 are preferably formed of stainless or galvanized steel tubes presenting inside diameters of approximately 2". As best illustrated in FIG. 1, the preferred conductive portions 18 and 20 are generally L-shaped; however, as those skilled in the art will appreciate, they may be formed in a variety of shapes and sizes. The conductive portions 18 and 20 include distal ends 28 and 30 spaced away from the gate hinge or shaft. The distal ends 28 and 30 present openings 32 therein for receiving the non-conductive coupler 22 as described below.

When joined, the conductive portions 18 and 20 define first and second loop portions 24 and 26. Since the conductive portions 18 and 20 are formed of steel material, these loop portions 24 and 26 are normally magnetically conductive. Thus, the loop portions 24 and 26 would normally become energized when passed through the portal structure 12. However, as described below, a non-conductive coupler 22 interconnects the conductive portions 18 and 20 for preventing the creation of a magnetically conductive loop.

The entry gate 10 may also include additional conductive portions such as vertically extending reinforcing cross-members 31, 33, 34, and 35. The cross-members are preferably formed of stainless or galvanized steel tubes and have ends which present openings 32 therein. The cross-members are joined at their respective openings by a non-conductive coupler 22. The cross-members 31, 33, 34, and 35 can also be formed of a solid non-conductive material such as a synthetic resin or ceramic.

Figure 3:
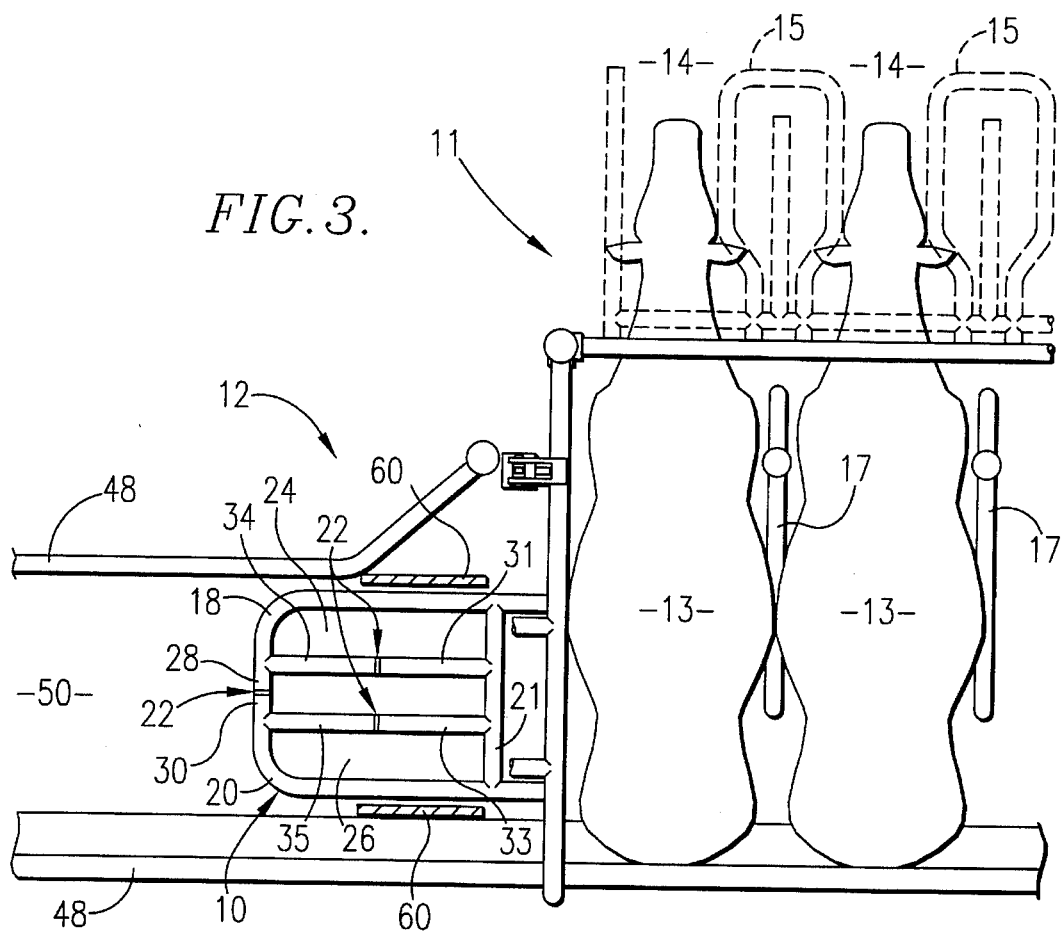
FIG. 3 is a fragmentary plan view of the dairy parlor showing two cows in the stalls in milking position with the gate in the open position.

The entry gate 10 also includes a third magnetically conductive portion 21 positioned adjacent the entry gate shaft 40. The conductive portion 21 is also formed of stainless or galvanized steel tubes but does not include a non-conductive coupler. Therefore, the conductive portion 21 becomes magnetically conductive when exposed to the electromagnetic field present in the portal structure 12. Accordingly, as best illustrated in FIG. 3, the entry gate 10 must be positioned relative to the portal structure 12 so that the third magnetically conductive portion 21 does not enter the portal structure 12 when the entry gate 10 is opened.

Figure 5:
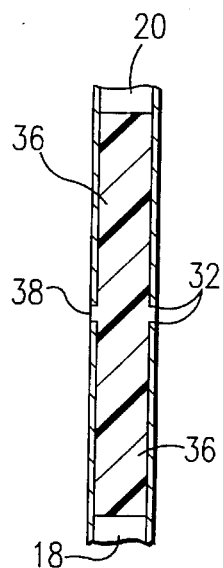
FIG. 5 is a enlarged, fragmentary cross-sectional view of the gate hereof showing the non-magnetic coupler for joining the two tubular magnetically-conductive portions.

The non-conductive coupler 22 is provided for joining the conductive portions 18 and 20 together without permitting the creation of a magnetically conductive loop in the entry gate 10. A non-conductive coupler 22 may also be provided for joining the cross-members 31, 33, 34, and 35 together. As best illustrated in FIG. 5 the non-conductive coupler 22 is preferably cylindrical in shape and includes a pair of opposed insert portions 36 connected by a raised radially extending shoulder portion 38. The coupler 22 is formed of non-conductive solid material such as synthetic resins, ceramics, or non-conductive materials which effectively insulate the conductive portions 18 and 20. The coupler 22 may be molded or machined to shape.

The insert portions 36 are tubular in shape and have a solid core. In preferred forms, the insert portions 36 are approximately 6" in length and present an outside diameter approximately equal to the inside diameter of the openings 32 in the conductive portions 18 and 20. The insert portions 36 are inserted into the openings 32 for joining the conductive portions 18 and 20 together. T or cruciform non-conductive couplers may be provided for joining three or four magnetically conductive portions, if desired.

The shoulder portion 38 is provided for electrically isolating the conductive portions 18 and 20 from one another so that there are no magnetically conductive loops formed on entry gate 10. The preferred shoulder portion 38 is integrally formed of the same non-conductive material as the insert portions 36. As best illustrated in FIG. 5, the shoulder portion 38 is positioned at the mid-point of the insert portions 36 and extends radially therefrom. The preferred shoulder portion 38 presents an outside diameter slightly greater than the outside diameter of the openings 32 in the conductive portions 18 and 20, and presents a width of approximately ½". When coupled between the conductive portions 18 and 20, the shoulder portion 38 prevents contact between the conductive portions 18 and 20 and prevents the formation of an magnetically conductive loop.

Figure 2:
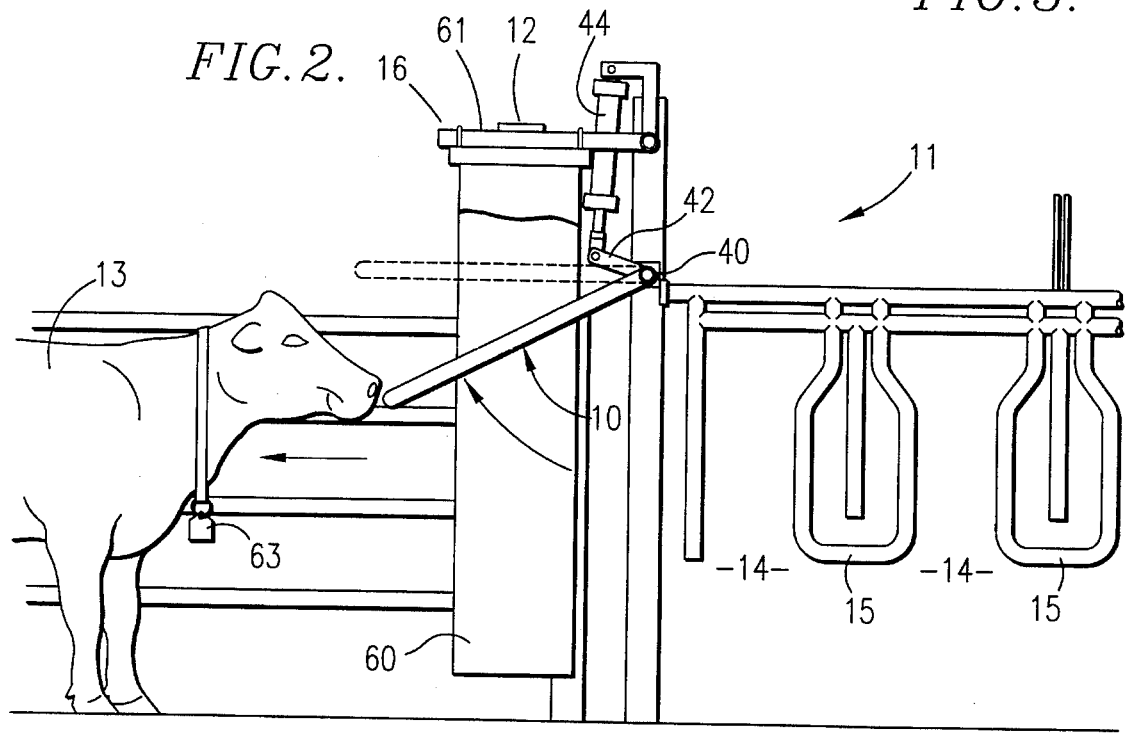
FIG. 2 is a fragmentary side elevational view of the dairy parlor showing the gate opening to force the first cow back through the portal of the electronic identification system.

To assemble the entry gate 10, the conductive portions 18 and 20 are joined by a non-conductive coupler 22. Similarly, the cross-members 31, 33, 34, and 35 are joined by additional non-conductive couplers 22. As best illustrated in FIG. 2, the assembled entry gate 10 is preferably positioned proximate the portal structure 12 and is mounted on hinges or a shaft 40 for allowing the entry gate 10 to swing through the portal structure 12. In this way, the first cow in the milking line is required to back away from the portal structure 12. This insures that the first cow is counted as its transponder is energized as it passes through the portal structure 12.

As illustrated in FIG. 1, the entry gate 10 is preferably rotatably mounted on a shaft 40 having a horizontal axis. Accordingly, the entry gate 10 swings up and down relative to this horizontal axis. When closed, the entry gate is preferably oriented in a vertical plane and positioned so as to hold the cow against undesired lateral movement to thereby aid the operator in attaching milking apparatus to the udder. The entry gate 10 is preferably provided with a bell crank arm 42 (see FIG. 2) coupled to an extensible member 44 such as a ram or piston for selectively swinging the entry gate 10 between an open and closed position.

Figure 4:
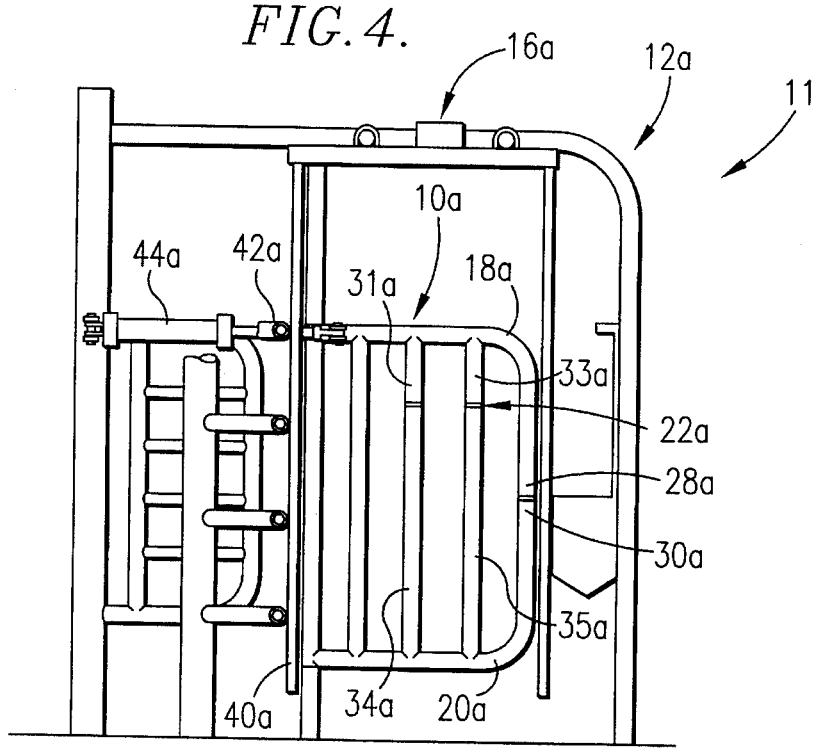
FIG. 4 is a front elevational view of the dairy parlor entry gate and milking parlor similar to FIG. 1, but showing an alternate embodiment of the gate mounted for swinging about a vertical axis.

Alternatively, as illustrated in FIG. 4, the entry gate 10a may be rotatably mounted on a shaft 40a having a vertical axis. In this second embodiment, the entry gate 10a swings side to side relative to this vertical axis. This embodiment is also provided with a bell crank arm 42a coupled to an extensible member 44a such as a ram or piston for selectively swinging the entry gate 10a between an open and closed position.

The entry gate 10 as described above is preferably used in a milking parlor 11 for controlling the passage of a plurality of cows 13 through the milking parlor 11. The preferred milking parlor 11 includes a plurality of upright stanchions 48 or fences which define an animal passage lane 50 which lead to a plurality of milking stalls 14. The milking stalls 14 may be positioned relative to one another in a variety of different arrangements including parallel or herringbone, but the entry gate 10 is optimally employed in a parallel parlor.

As illustrated in FIG. 3, each of the milking stalls 14 includes a swingably mounted barrier gate 15 and a pivotally mounted barrier fence 17 for maintaining the position of the cows 13 during milking. Once a milking cycle is completed, the barrier gates 15 are raised so that the cows 13 can exit the milking stalls 14 and leave the milking parlor 11. Thereafter, a new set of cows are guided into the milking stalls for milking.

The milking parlor 11 also includes a portal structure 12 disposed between the animal passage lane 50 and the milking stalls 14. The cows 13 are directed through the portal structure before entering the milking stalls 14. As best illustrated in FIG. 2, the portal structure 12 includes a pair of vertically extending flexible curtains 60 attached to a horizontally extending cover member 61. It may be understood that other portal structures which might include rigid members could also be used.

The portal structure 12 also includes an animal identification system 16 for counting the number of animals passing therethrough. The animal identification system 16 includes an antenna loop attached to the flexible curtains 60 for generating a multi-directional electromagnetic field within the confines of the portal structure 12. The animal identification system 16 also includes a plurality of transponders 63 (see FIG. 2) which are placed around the cows' necks. The transponder 63 includes parallel resonant circuitry which is tuned to the frequency of the electromagnetic field emitted by the antenna loop. Thus, when a transponder 63 passes through the electromagnetic field contained in the portal structure 12, it is energized. Once energized, the transponder 63 transmits identifying information back to the antenna loop for identifying and counting the cow passing through the portal structure 12.

As best illustrated in FIG. 3, the entry gate 10 is positioned between the portal structure 12 and the milking stalls 14 for controlling the passage of the cows therethrough. In particularly preferred forms, the portal structure 12 and milking stalls 14 are positioned so that the entry gate 10 is immediately adjacent the first milking stall. In this way, the entry gate 10 retains the last cow in the milking stalls 14 in position while preventing the passage of a second set of cows into the milking stalls 14. Since the third magnetically conducted portion 21 of the entry gate 10 does not include a non-conductive coupler, the entry gate 10 must be positioned relative to the portal structure 12 so that the third magnetically conductive portion 21 does not enter the portal structure 12 when the entry gate 10 is opened.

The above described arrangement allows the entry gate 10 to effectively control the passage of animals through the portal structure 12 without interfering with the operation of the animal identification system 16. Since the entry gate 10 is formed primarily of steel tubes, it has sufficient strength to withstand the impact of large dairy animals. Moreover, since the entry gate 10 contains non-conductive couplers 22, no magnetically conductive loops are formed in the entry gate 10. Thus, the entry gate 10 can be positioned to swing into and/or through the electromagnetic field created by the animal identification system 16 without interfering with its operation.

Although the invention has been described with reference to the preferred embodiment illustrated in the attached drawing figures, it is noted that equivalence may be employed and substitutions made herein without departing from the scope of the invention as recited in the claims. For example, although the invention has been described above for use in a dairy parlor, it is readily apparent to those skilled in the art that the present invention may be used with a portal structure for controlling the passage of other objects such as other animals or people.

Having thus described the preferred embodiment of the invention, what is claimed as new and desired to be protected by Letters Patent includes the following:

1. A gate adapted for swingable mounting in a dairy parlor to control the entry of animals into a milking area, comprising:

a first magnetically conductive member defining a first loop portion;

a second magnetically conductive member defining a second loop portion; and non-magnetic coupling means rigidly interconnecting said first and second magnetically conductive members preventing relative shifting therebetween to form a loop.

2. A gate as set forth in claim 1 including mounting structure for swingably carrying said loop.

3. A gate as set forth in claim 2 wherein said mounting structure includes a crank arm adapted for receiving an extensible member for swinging said gate.

4. A gate as set forth in claim 1 including a third magnetically conductive member and at least one additional non-magnetic coupling means for interconnecting said third member within the loop formed by said first and second members, said additional coupling means insulating said members and interrupting any magnetic loops otherwise formed by said third member.

5. A gate as set forth in claim 4 wherein said first and second magnetically conductive members are tubular and meet at a common intersection, and said non-magnetic coupling means presents a plurality of inserts for extending into said magnetically conductive members and a shoulder for interrupting any magnetic connection therebetween.

6. A gate as set forth in claim 5 wherein said coupling means is of synthetic resin material.

7. A gate as set forth in claim 1 wherein said first and second magnetically conductive members are tubular and said non-magnetic coupling means presents a pair of inserts for extending into said first and second magnetically conductive members and a radially extending shoulder for interrupting any magnetic connection therebetween.

8. A gate as set forth in claim 7 wherein said coupling means is of synthetic resin material.

9. A gate as set forth in claim 1 including a bar of non-magnetically conductive material structurally connecting said first and second magnetically conductive members.

10. A dairy parlor comprising, in combination:

substantially opposed stanchion members defining an animal passage lane;

an identification system including portal structure for creating an electromagnetic field positioned in the animal passage lane for energizing identification tags worn by the animals passing through said portal structure;

a gate; and means swingably mounting said gate adjacent said portal structure for selective movement of said gate into said electromagnetic field.

11. A dairy parlor as set forth in claim 10 wherein said gate includes magnetically conductive material substantially defining a loop and magnetically non-conductive material interrupting the formation of any magnetic loop in said gate which is oriented for swinging into through said electromagnetic field.

12. A dairy parlor as set forth in claim 11 wherein said gate mounting means positions said gate along said animal passage lane intermediate said portal structure and a milking stall.

13. A dairy parlor as set forth in claim 12 wherein said gate is swingably mounted for movement between a first position for limiting the movement of a dairy animal in the milking stall and a second position for permitting a dairy animal to pass through the portal structure into the dairy stall.

14. A dairy parlor as set forth in claim 13, wherein said parlor includes a plurality of milking stalls configured for orienting said dairy animals in common, parallel alignment during milking.

15. A dairy parlor as set forth in claim 14, wherein said plurality of milking stalls are oriented substantially normally to said passage lane, said gate being positioned to maintain a perpendicular orientation of an animal positioned in the milking stall adjacent the gate relative to the passage lane.

16. A dairy parlor as set forth in claim 10 wherein said mounting means enables swingable movement of said gate about a substantially upright axis.

17. A dairy parlor as set forth in claim 10 wherein said mounting means enables swingable movement of said gate about a substantially horizontal axis.

\* \* \* \* \*